(12) United States Patent
Yan et al.

(10) Patent No.: US 11,515,774 B2
(45) Date of Patent: Nov. 29, 2022

(54) VIBRATION MOTOR WITH MAGNETIC STEEL ASSEMBLY AND ELASTIC SUPPORT BETWEEN PILLARS

(71) Applicant: AAC Technologies Pte. Ltd., Singapore (SG)

(72) Inventors: Xudong Yan, Shenzhen (CN); Yunhao Jin, Shenzhen (CN); Pengfei Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 239 days.

(21) Appl. No.: 16/995,713

(22) Filed: Aug. 17, 2020

(65) Prior Publication Data

US 2020/0412221 A1 Dec. 31, 2020

Related U.S. Application Data

(63) Continuation of application No. PCT/CN2019/093761, filed on Jun. 28, 2019.

(51) Int. Cl.
*H02K 33/00* (2006.01)
*H02K 33/06* (2006.01)

(52) U.S. Cl.
CPC .................................. *H02K 33/06* (2013.01)

(58) Field of Classification Search
CPC ........... B06B 1/00; B06B 1/02; B06B 1/0215; B06B 1/0223; B06B 1/0269; B06B 1/0614; B06B 1/04; B06B 1/045; H02K 33/06; H02K 33/00; H02K 33/02; H02K 33/14; H02K 33/16; H02K 33/18; H02K 35/00; H02K 35/04; H02N 2/02

USPC ....... 310/25, 15, 81, 80, 321, 20, 21, 28–30, 310/36–37, 12.01–12.27; 381/400–422; 359/824

See application file for complete search history.

(56) References Cited

U.S. PATENT DOCUMENTS 7,635,933 B2 * 12/2009 Makino .............. H02K 15/0068
310/68 B
7,654,792 B2 * 2/2010 Kikuichi ............... F04D 29/601
415/214.1

(Continued)

FOREIGN PATENT DOCUMENTS

CN 204030834 U * 12/2014 ............. H02K 33/16
CN 104617735 A * 5/2015 ............. H02K 33/16

(Continued)

OTHER PUBLICATIONS

CN207573210U preview English Translation.*

*Primary Examiner* — Maged M Almawri
(74) *Attorney, Agent, or Firm* — W&G Law Group (57) ABSTRACT

The present disclosure discloses a vibration motor including a fixing frame, a suspending frame, an iron core, a drive coil, an elastic support and a magnetic steel assembly. The magnetic steel assembly includes a first magnetic steel, a second magnetic steel and a third magnetic steel that are superimposed in order. Polarity directions of the first magnetic steel and third magnetic steel are parallel with a central axis of the drive coil. A side of the first magnetic steel that the side facing the second magnetic steel has the same polarity with a side of the third magnetic steel that the side facing the second magnetic steel. The vibration motor can generate two magnetic loops whose magnetic forces increases drive force of the vibration motor.

14 Claims, 7 Drawing Sheets

(56) References Cited

U.S. PATENT DOCUMENTS

| | | | | |
|---|---|---|---|---|
| 7,671,493 B2* | 3/2010 | Takashima | G06F 3/016 | 310/15 |
| 7,988,810 B2* | 8/2011 | Tamaoka | F16C 17/107 | 156/321 |
| 7,999,421 B2* | 8/2011 | Kim | H02K 33/18 | 310/15 |
| 8,269,379 B2* | 9/2012 | Dong | H02K 33/16 | 310/28 |
| 8,288,898 B2* | 10/2012 | Jun | H02K 33/16 | 310/34 |
| 8,599,517 B1* | 12/2013 | Abe | G11B 19/2009 | 360/99.08 |
| 8,659,850 B2* | 2/2014 | Himeno | G11B 25/043 | 310/90 |
| 8,693,138 B2* | 4/2014 | Saeki | G11B 19/2009 | 310/71 |
| 8,737,017 B1* | 5/2014 | Abe | G11B 19/2009 | 360/99.08 |
| 8,829,741 B2* | 9/2014 | Park | B06B 1/045 | 310/25 |
| 8,873,196 B2* | 10/2014 | Masumi | H02K 11/33 | 360/99.08 |
| 8,873,198 B1* | 10/2014 | Iwasaki | H02K 5/1677 | 360/99.08 |
| 8,878,401 B2* | 11/2014 | Lee | H02K 33/16 | 310/15 |
| 8,941,946 B2* | 1/2015 | Sekii | G11B 19/2036 | 310/90 |
| 9,001,461 B1* | 4/2015 | Yawata | G11B 19/2009 | 360/99.08 |
| 9,048,718 B2* | 6/2015 | Zhang | H02K 33/18 | |
| 9,088,191 B2* | 7/2015 | Yokogawa | H02K 3/345 | |
| 9,140,268 B2* | 9/2015 | Teshima | F04D 25/062 | |
| 9,190,880 B2* | 11/2015 | Sugi | G11B 33/1473 | |
| 9,225,265 B2* | 12/2015 | Oh | H02N 2/001 | |
| 9,458,852 B2* | 10/2016 | Yoo | F04D 29/667 | |
| 9,614,425 B2* | 4/2017 | Jin | H02K 33/12 | |
| 9,721,608 B2* | 8/2017 | Takahashi | H02K 5/1677 | |
| 9,774,236 B2* | 9/2017 | Xu | H02K 33/04 | |
| 9,800,118 B2* | 10/2017 | Iwai | H02K 1/32 | |
| 9,812,163 B2* | 11/2017 | Yoneda | G11B 19/2009 | |
| 9,876,409 B2* | 1/2018 | Kajiyama | H02K 5/15 | |
| 9,886,984 B2* | 2/2018 | Akagi | G11B 25/043 | |
| 9,935,535 B2* | 4/2018 | Guo | H02K 33/16 | |
| 9,936,302 B2* | 4/2018 | Linghu | H04R 9/06 | |
| 9,973,048 B2* | 5/2018 | Kawamoto | H02K 1/2773 | |
| 10,033,257 B2* | 7/2018 | Zhang | H02K 33/12 | |
| 10,076,771 B2* | 9/2018 | Xu | H02K 33/12 | |
| 10,079,519 B2* | 9/2018 | Hamagishi | H02K 5/148 | |
| 10,103,614 B2* | 10/2018 | Guo | H02K 33/16 | |
| 10,116,194 B2* | 10/2018 | Mao | H02K 11/215 | |
| 10,153,681 B2* | 12/2018 | Mao | H02K 33/16 | |
| 10,158,277 B2* | 12/2018 | Chun | H02K 33/16 | |
| 10,158,278 B2* | 12/2018 | Mao | H02K 33/16 | |
| 10,270,304 B2* | 4/2019 | Wang | H02K 33/16 | |
| 10,307,791 B2* | 6/2019 | Xu | B06B 1/045 | |
| 10,505,408 B2* | 12/2019 | Nakahara | H02K 15/022 | |
| 10,710,115 B2* | 7/2020 | Huang | H02K 33/02 | |
| 10,797,576 B2* | 10/2020 | Wu | H02K 33/16 | |
| 10,931,185 B2* | 2/2021 | Tang | H02K 33/12 | |
| 10,971,984 B2* | 4/2021 | Liu | H02K 33/10 | |
| 11,081,950 B2* | 8/2021 | Zhang | H02K 33/18 | |
| 11,201,531 B2* | 12/2021 | Jin | H02K 33/16 | |
| 2006/0066164 A1* | 3/2006 | Kim | H02K 7/063 | 310/81 |
| 2006/0091733 A1* | 5/2006 | Binnard | H02K 41/0356 | 355/53 |
| 2010/0302752 A1* | 12/2010 | An | H02K 33/06 | 361/807 |
| 2011/0018364 A1* | 1/2011 | Kim | H02K 33/18 | 310/20 |
| 2011/0018365 A1* | 1/2011 | Kim | B06B 1/045 | 310/20 |
| 2011/0156500 A1* | 6/2011 | Dong | H02K 33/16 | 310/25 |
| 2011/0169347 A1* | 7/2011 | Miyamoto | G06F 3/016 | 310/12.21 |
| 2011/0198949 A1* | 8/2011 | Furuich | H02K 33/16 | 310/25 |
| 2011/0241451 A1* | 10/2011 | Park | B06B 1/045 | 310/25 |
| 2011/0266892 A1* | 11/2011 | Wauke | H02K 33/18 | 310/25 |
| 2012/0169148 A1* | 7/2012 | Kim | H02K 33/16 | 310/25 |
| 2012/0169151 A1* | 7/2012 | Dong | H02K 33/16 | 310/25 |
| 2014/0152126 A1* | 6/2014 | Kim | B06B 1/045 | 310/25 |
| 2014/0152141 A1* | 6/2014 | Saitou | H02K 9/223 | 310/214 |
| 2015/0123498 A1* | 5/2015 | Yang | H02K 33/16 | 310/25 |
| 2015/0137627 A1* | 5/2015 | Katada | H02K 33/16 | 310/25 |
| 2015/0194870 A1* | 7/2015 | Kim | H02K 33/18 | 310/25 |
| 2016/0013710 A1* | 1/2016 | Dong | H02K 33/16 | 310/25 |
| 2016/0226358 A1* | 8/2016 | Mao | H02K 33/16 | |
| 2016/0226359 A1* | 8/2016 | Guo | H02K 33/16 | |
| 2016/0254736 A1* | 9/2016 | Jin | H02K 33/16 | 310/25 |
| 2016/0336842 A1* | 11/2016 | Chun | H02K 33/16 | |
| 2017/0120298 A1* | 5/2017 | Mao | B06B 1/045 | |
| 2017/0214306 A1* | 7/2017 | Katada | H02K 33/16 | |
| 2017/0222532 A1* | 8/2017 | Wang | H02K 33/16 | |
| 2017/0288524 A1* | 10/2017 | Jin | H02K 5/225 | |
| 2018/0248457 A1* | 8/2018 | Shi | F16F 15/08 | |
| 2018/0297076 A1* | 10/2018 | Xu | B06B 1/045 | |
| 2018/0351442 A1* | 12/2018 | Liu | H02K 33/14 | |
| 2018/0358879 A1* | 12/2018 | Liu | H02K 1/34 | |
| 2019/0036401 A1* | 1/2019 | Takano | H02K 1/278 | |
| 2019/0036435 A1* | 1/2019 | Zhu | H02K 33/02 | |
| 2019/0044425 A1* | 2/2019 | Zu | H02K 33/18 | |
| 2019/0052160 A1* | 2/2019 | Oi | H02K 33/16 | |
| 2019/0305637 A1* | 10/2019 | Suzuki | H02K 7/063 | |
| 2020/0044526 A1* | 2/2020 | Tang | H02K 33/18 | |
| 2021/0211030 A1* | 7/2021 | Li | H02K 33/18 | |

FOREIGN PATENT DOCUMENTS

| | | | | |
|---|---|---|---|---|
| CN | 204334277 U | * | 5/2015 | |
| CN | 106026603 A | * | 10/2016 | H02K 33/00 |
| CN | 205847047 U | * | 12/2016 | |
| CN | 206195534 U | * | 5/2017 | |
| CN | 206195577 U | * | 5/2017 | |
| CN | 206195578 U | * | 5/2017 | |
| CN | 206341117 U | * | 7/2017 | |
| CN | 206498310 U | * | 9/2017 | |
| CN | 206878668 U | * | 1/2018 | |
| CN | 207559830 U | * | 6/2018 | |
| CN | 207573210 U | * | 7/2018 | |
| CN | 209313684 U | * | 8/2019 | |
| CN | 210780488 U | * | 6/2020 | |

\* cited by examiner

VIBRATION MOTOR WITH MAGNETIC STEEL ASSEMBLY AND ELASTIC SUPPORT BETWEEN PILLARS

TECHNICAL FIELD

The present disclosure relates to the technical field of motor structure, in particular a vibration motor used in a mobile terminal.

BACKGROUND

In the current market, vibration motors used in mobile terminals, especially those in mobile phones, have small driving force. In screen sound applications, when a vibration motor is used as a speaker, acoustic performance of the vibration motor is poor and a vibration motor with larger drive force is required to drive a screen.

Therefore, it is necessary to provide a vibration motor to solve the problem of small drive force of the existing vibration motors.

SUMMARY

The present disclosure aims to provide a vibration motor with larger drive force.

The technical solutions of the present disclosure are as follows:

In order to realize the above objective, the present disclosure provides a vibration motor including a fixing frame, a suspending frame, an iron core, a drive coil, an elastic support and a magnetic steel assembly. Herein, the suspending frame is suspended and is supported over the fixing frame by the elastic support. The iron core is installed on the fixing frame. The drive coil is wound around an outside wall of the iron core. The magnetic steel assembly is installed on the suspending frame and disposed at intervals on a periphery of the iron core. The magnetic steel assembly includes a first magnetic steel, a second magnetic steel and a third magnetic steel that are superimposed in order. Polarity directions of the first magnetic steel and third magnetic steel are parallel with a central axis of the drive coil. A polarity direction of the second magnetic steel is perpendicular to the central axis of the drive coil. A side of the first magnetic steel that the side facing the second magnetic steel has the same polarity with a side of the third magnetic steel that the side facing the second magnetic steel. Sides of the first and third magnetic steels that the sides being close to the second magnetic steel have the same polarities as a side of the second magnetic steel that the side being close to the drive coil.

As an improvement, the vibration motor includes an even number of the magnetic steel assembly, each two magnetic steel assemblies being one group that are disposed at two opposite sides of the drive coil.

As an improvement, the vibration motor includes two magnetic steel assemblies that are symmetrically disposed at two opposite sides of the drive coil.

As an improvement, the vibration motor includes four magnetic steel assemblies that are disposed at intervals around the drive coil.

As an improvement, the vibration motor further includes a magnetic conductive plate that is disposed between the magnetic steel assembly and the suspending frame.

As an improvement, an outside wall of the iron core is provided with a winding groove, and the drive coil is wound in the winding groove.

As an improvement, the iron core includes a first plate, a second plate that is disposed as parallel with the first plate and that is connected with the fixing frame, and a connected body disposed between the first plate and the second plate. The first plate, an outside wall of the connected body and the second plate are enclosed to form the winding groove.

As an improvement, a side of the suspending frame that the side facing the fixing frame is provided with a first pillar, and a side of the fixing frame that the side correspondingly facing the suspending frame is provided with a second pillar. The elastic support includes a first fixing end connected with the first pillar, a second fixing end connected with the second pillar and a bending portion connected between the first fixing end and the second fixing end.

As an improvement, the bending portion includes an arc extending portion, a first inclined extending portion that is inclined and connected between the arc extending portion and the first fixing end, and a second inclined extending portion that is inclined and connected between the arc extending portion and the second fixing end. The first inclined extending portion and the second inclined extending portion are inclined and extended to the arc extending portion from the first fixing end and the second fixing end with a distance between the first inclined extending portion and the second inclined extending portion gradually decreasing.

As an improvement, the vibration motor includes four elastic supports arranged at intervals out of the drive coil.

The present disclosure is advantageous in that, a stator is an electromagnetic structure that a drive coil is wound on a soft magnetic iron core, and a mover is a suspending frame plus magnetic steel assemblies that are disposed around the drive coil. In the magnetic steel assembly, a side of a first magnetic steel that the side facing a second magnetic steel has the same polarity with a side of a third magnetic steel that the side facing the second magnetic steel, and sides of the first and third magnetic steels that the sides being close to the second magnetic steel have the same polarities as a side of the second magnetic steel that the side being close to the drive coil. When current accesses to the drive coil, the first magnetic steel, the second magnetic steel and the drive coil form a closed magnetic loop, and the third magnetic steel, the second magnetic steel and the drive coil may form another closed magnetic loop. Magnetic field forces of the two magnetic loops can synchronously drive the magnetic steel assembly to move the suspending frame in the same direction, so that drive force of the vibration motor is increased.

Reference signs: 1, vibration motor; 10, fixing frame; 11, second pillar; 20, suspending frame; 21, first pillar; 30, iron core; 31, winding groove; 32, first plate; 33, second plate;

34, connected body; 40, drive coil; 50, elastic support; 51, first fixing end; 52, second fixing end; 53, bending portion; 531, first inclined extending portion; 532, second inclined extending portion; 533: arc extending portion; 60, magnetic steel assembly; 61, first magnetic steel; 62, second magnetic steel; 63, third magnetic steel; 70, magnetic conductive plate.

DETAILED DESCRIPTION

A further description is provided on the present disclosure with reference to the drawings and embodiments.

It shall be noted that in the present disclosure, all directional expressions (such as up, down, inner, outer, top, bottom, etc.) are merely used for explaining relationships of relevant locations between different parts under a certain circumstance (as shown in the drawings). If a circumstance changes, a directional expression changes also.

It shall be noted that when an element is expressed as "fixed to" or "disposed on" another element, the former element may be directly on the other element, or there may be a third element in between. When an element is expressed as "connected to" another element, the former element may be directly connected to the other element, or there may be a third element in between.

Referring to FIG. 1 to FIG. 7, an embodiment of the present disclosure provides a vibration motor 1 including a fixing frame 10, a suspending frame 20, an iron core 30, a drive coil 40, an elastic support 50, a magnetic steel assembly 60 and a magnetic conductive plate 70. Four elastic supports 50 are arranged at intervals out of the drive coil 40. The suspending frame 20 is suspended and supported over the fixing frame 10 by the four elastic supports 50. The suspending frame 20 and the fixing frame 10 are disposed at intervals, and the suspending frame 20 may perform an up-and-down movement relative to the fixing frame 10 when affected by an external force.

The iron core 30 is installed in the middle of a side of the fixing frame 10 that the side facing the suspending frame 20. The drive coil 40 is wound around an outside wall of the iron core 30. Preferably, the outside wall of the iron core 30 is provided with a winding groove 31, and the drive coil 40 is wound in the winding groove 31. The magnetic steel assembly 60 is installed on the suspending frame 20 through the magnetic conductive plate 70, the magnetic steel assembly 60 is in a suspending state relative to the fixing frame 10, and the magnetic steel assembly 60 is provided at a periphery of and is separated from the iron core 30. In the present disclosure, a stator of the vibration motor 1 is an electromagnetic structure that the drive coil 40 winds on the soft iron core 30, and a mover is the suspending frame 20 plus magnetic steel assemblies 60 that are disposed around the drive coil 40.

Referring to FIG. 2 to FIG. 5, specifically, in the embodiment, the magnetic steel assembly 60 includes a first magnetic steel 61, a second magnetic steel 62 and a third magnetic steel 63 that are superimposed in order. Polarity directions of the first magnetic steel 61 and third magnetic steel 63 are parallel with a central axis of the drive coil 40, i.e., the first magnetic steel 61 and the third magnetic steel 63 are magnetized vertically. A polarity direction of the second magnetic steel 62 is perpendicular to the central axis of the drive coil 40, i.e., the second magnetic steel 62 is magnetized horizontally. A side of the first magnetic steel 61 that the side facing the second magnetic steel 62 has the same polarity with a side of the third magnetic steel 63 that the side facing the second magnetic steel 62, i.e., the first magnetic steel 61 and the third magnetic steel 63 are magnetized in opposite directions. A side of the first magnetic steel 61 that the side being close to the second magnetic steel 62 has the same polarity as a side of the second magnetic steel 62 that the side being close to the drive coil 40. A side of the third magnetic steel 63 that the side being close to the second magnetic steel 62 has the same polarity as the side of the second magnetic steel 62 that the side being close to the drive coil 40. The third magnetic steel 63 is connected with the magnetic conductive plate 70. When current accesses to the drive coil 40, the first magnetic steel 61, the second magnetic steel 62 and the drive coil 40 form a closed magnetic loop, and the third magnetic steel 63, the second magnetic steel 62 and the drive coil 40 may form another closed magnetic loop. Magnetic field forces of the two magnetic loops can synchronously drive the magnetic steel assembly 60 to move the suspending frame 20 in the same direction, so that drive force of the vibration motor 1 is increased to drive the mover to perform a vertical movement with greater drive force, and so that an amplitude during vibration is stable with small force fluctuation, and an acoustic performance is outstanding when the vibration motor is used as a speaker.

Preferably, there is an even number of the magnetic steel assembly 60, each two magnetic steel assemblies 60 being one group that is disposed at two opposite sides of the drive coil 40, so as to stably drive the mover to operate.

As a preferable implementation of this embodiment, there are four magnetic steel assemblies 60 that are disposed at intervals around the drive coil 40. Alternatively, in practice, there are more ways of arrangement in terms of number and disposition to the magnetic steel assembly 60. For example, the number of the magnetic steel assembly 60 may be disposed as two, and the two magnetic steel assemblies 60 are symmetrically disposed at two opposite sides of the drive coil 40.

Figure 1:
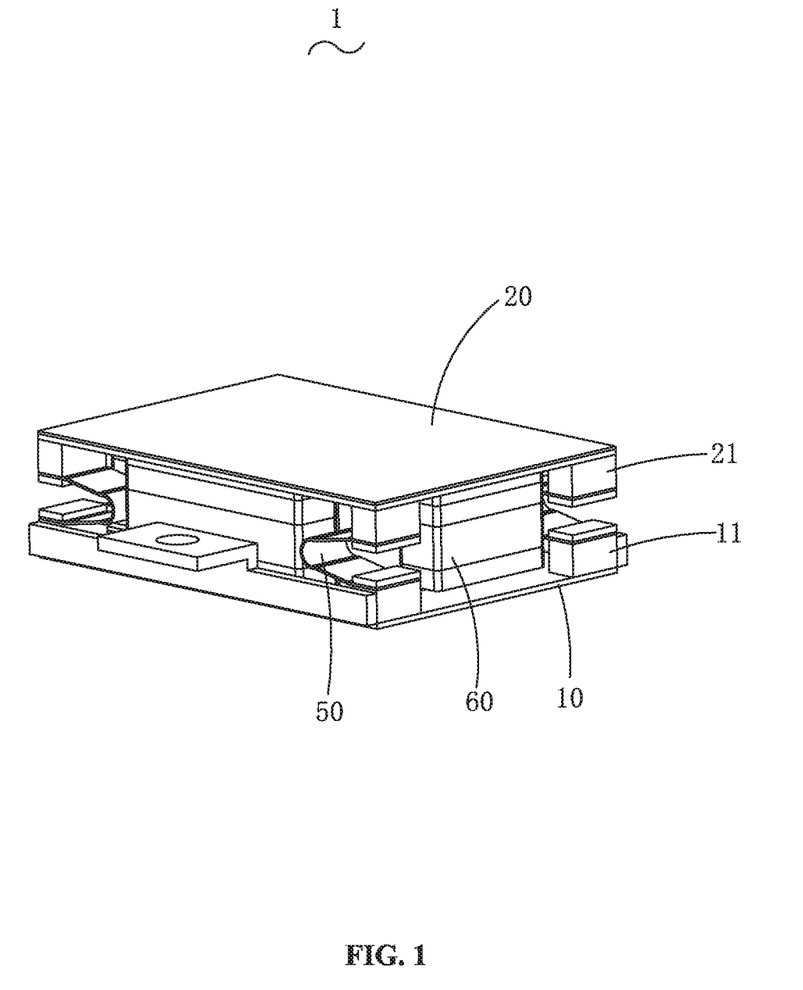
FIG. 1 is a stereoscopic view of a vibration motor according to an embodiment of the present disclosure.
Figure 2:
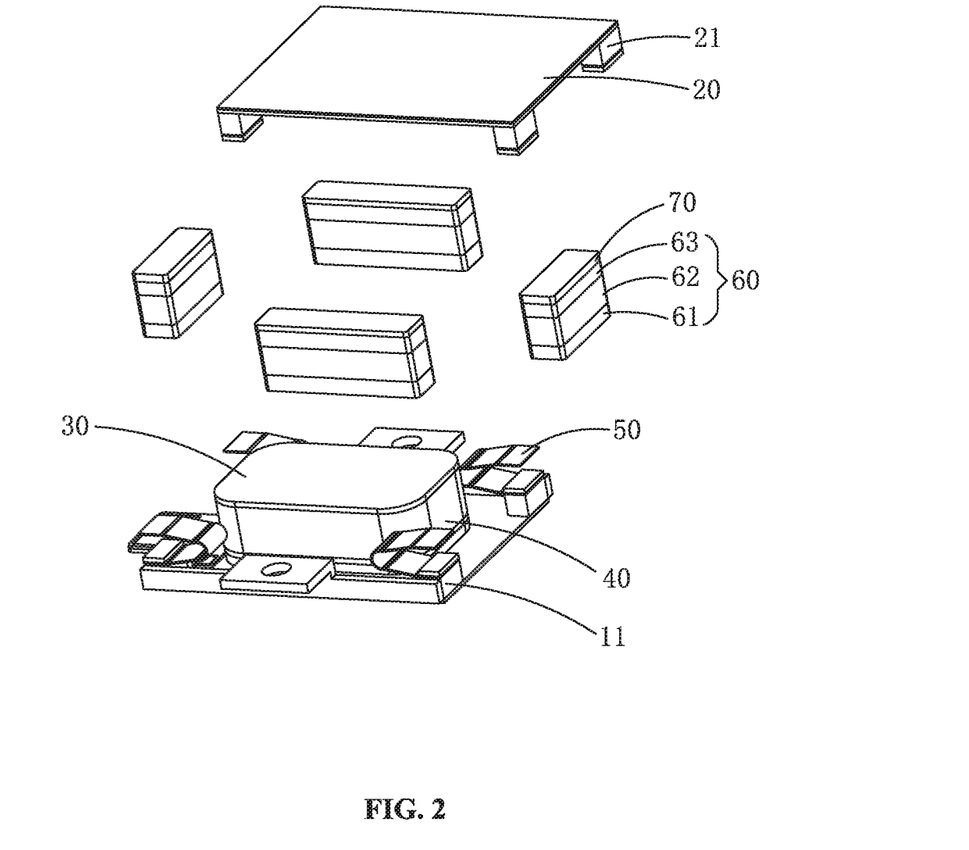
FIG. 2 is an exploded view 1 of the vibration motor according to an embodiment of the present disclosure.
Figure 3:
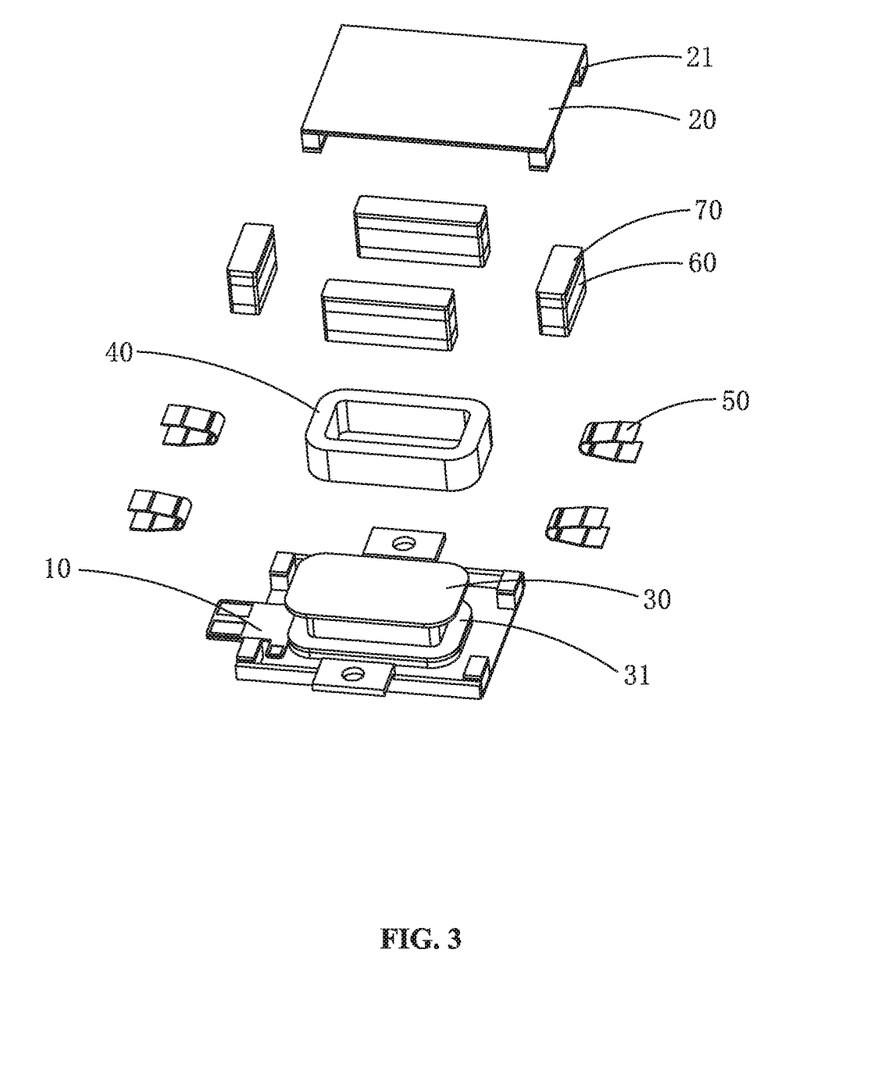
FIG. 3 is an exploded view 2 of the vibration motor according to an embodiment of the present disclosure.
Figure 4:
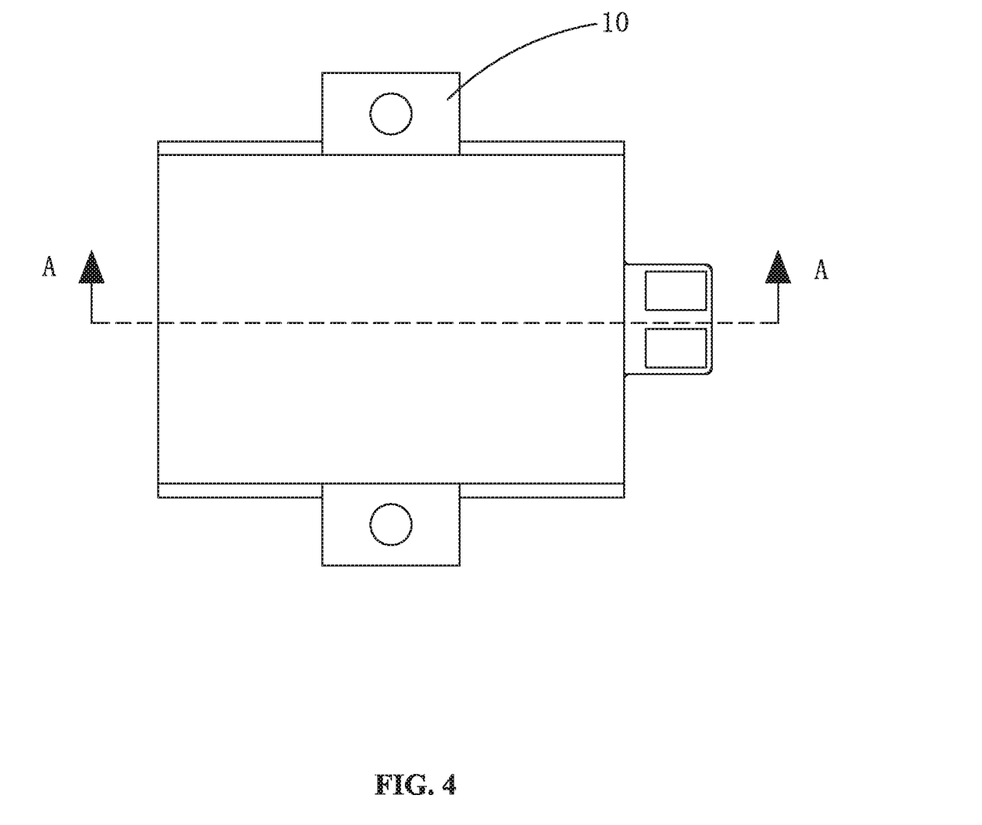
FIG. 4 is a top view of the vibration motor according to an embodiment of the present disclosure.
Figure 5:
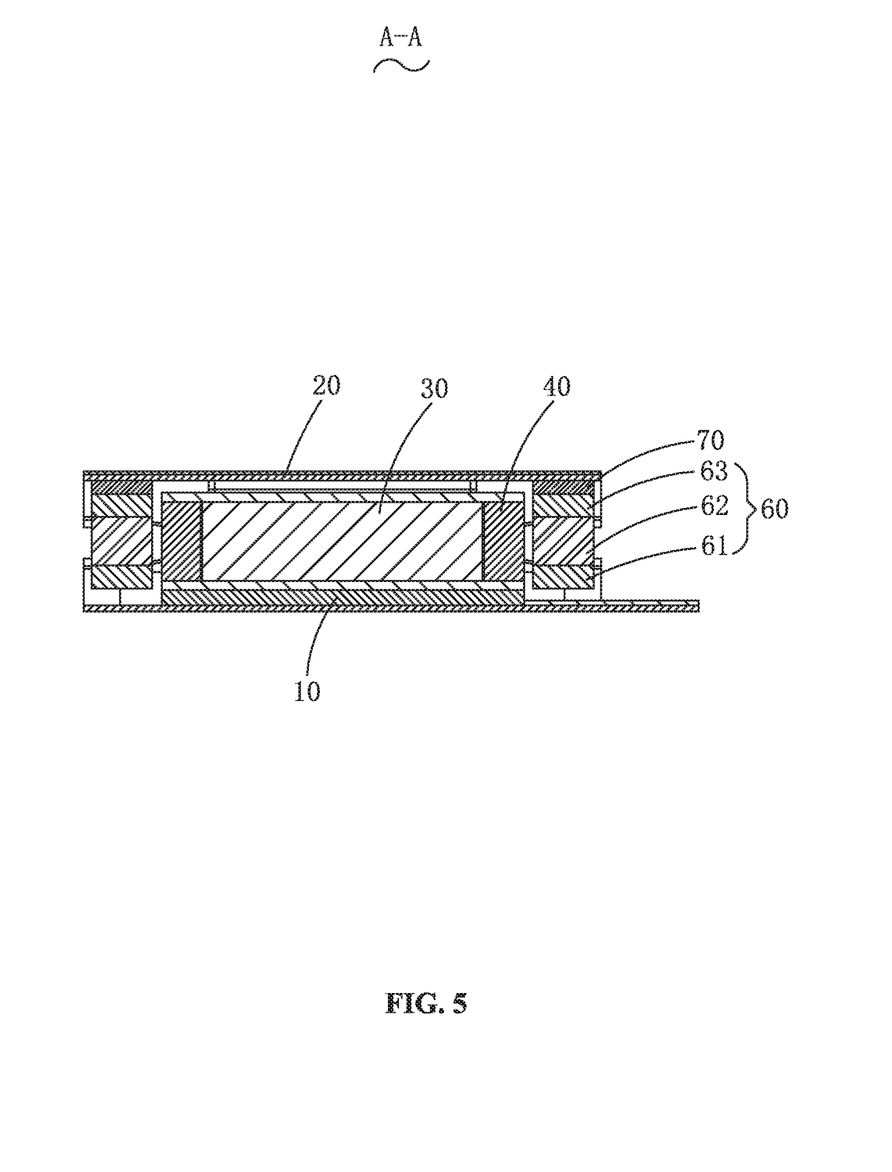
FIG. 5 is a sectional view of A-A in FIG. 4.
Figure 6:
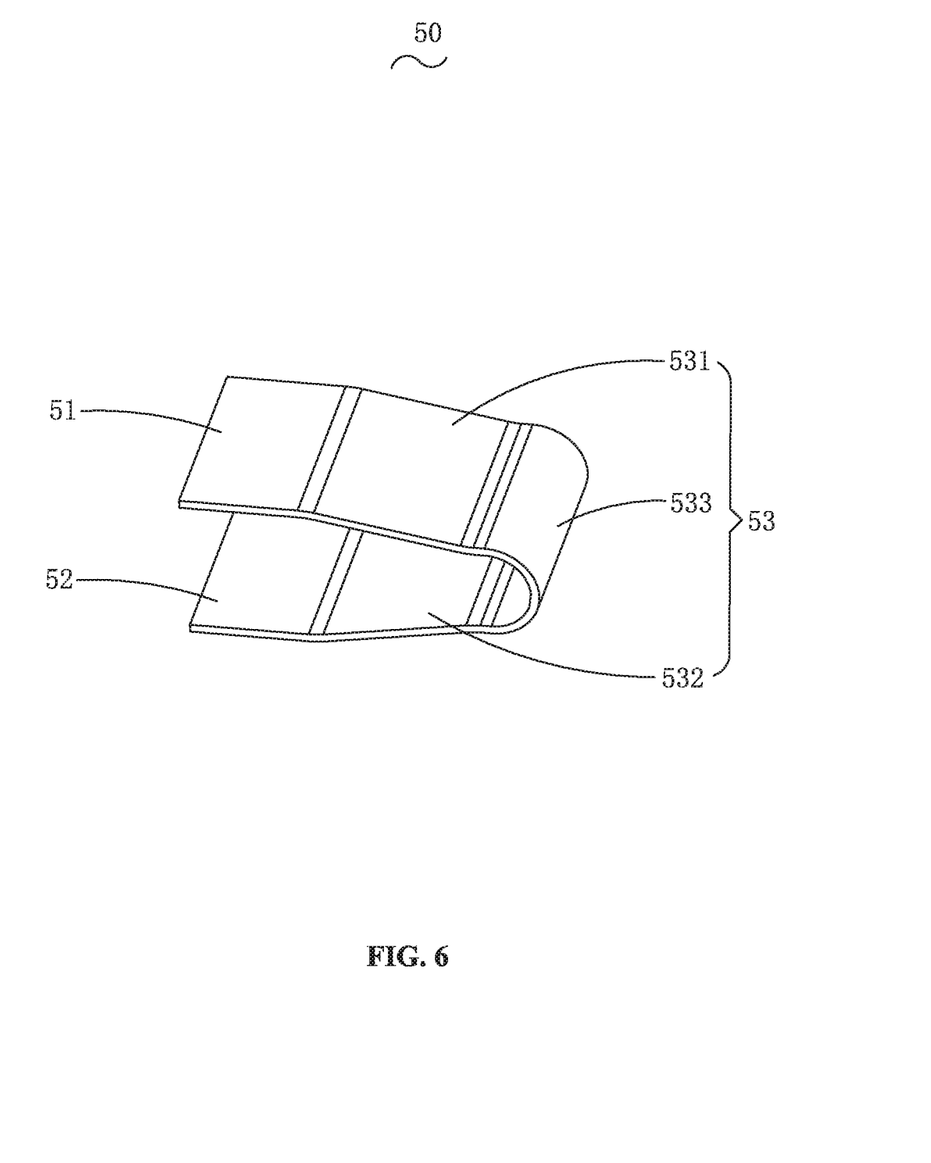
FIG. 6 is a stereoscopic view of an elastic support according to an embodiment of the present disclosure.

With further referring to FIG. 6, in this embodiment, a side of the suspending frame 20 that the side facing the fixing frame 10 is provided with a first pillar 21, and a side of the fixing frame 10 that the side correspondingly facing the suspending frame 20 is provided with a second pillar 11. The elastic support 50 is a U-shaped elastic sheet that includes a first fixing end 51 connected with the first pillar 21, a second fixing end 52 connected with the second pillar 11, and a bending portion 53 bending and connected between the first fixing end 51 and the second fixing end 52. Through elastic supporting of the bending portion 53 itself, the suspending frame 20 is suspended over the fixing frame 10. Besides, in order to reduce a size of the vibration motor 1, the bending portion 53 is disposed at a side close to the iron core 30.

Preferably, the bending portion 53 includes a first inclined extending portion 531, a second inclined extending portion 532 and an arc extending portion 533. The first inclined extending portion 531 is inclined and connected between the arc extending portion 533 and the first fixing end 51, the second inclined extending portion 532 is inclined and connected between the arc extending portion 533 and the second fixing end 52. The first inclined extending portion 531 and the second inclined extending portion 532 are inclined and extended to the arc extending portion 533 from the first fixing end 51 and the second fixing end 52 with a distance between the first inclined extending portion 531 and the second inclined extending portion 532 gradually decreasing.

Figure 7:
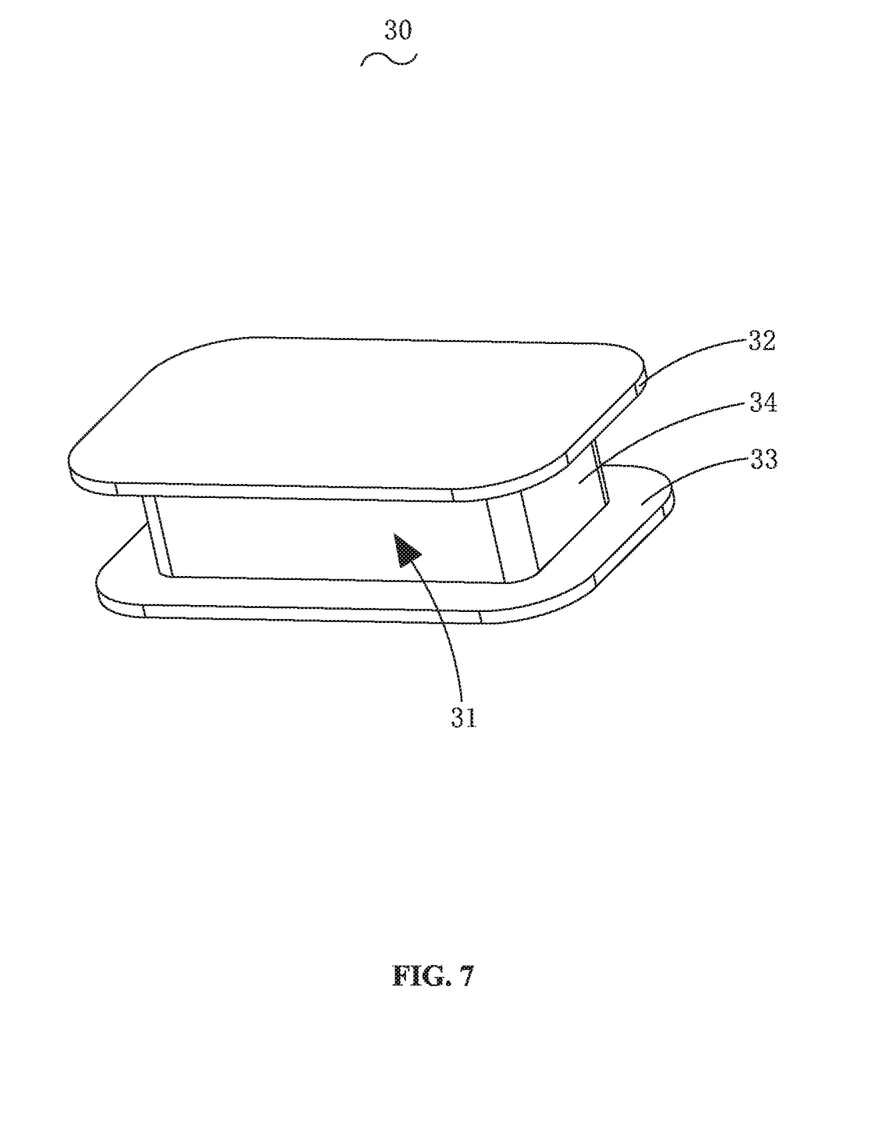
FIG. 7 is a stereoscopic view of an iron core according to an embodiment of the present disclosure.

With further referring to FIG. 7, in this embodiment, the iron core 30 includes a first plate 32, a second plate 33 that is disposed as parallel with the first plate 32, and a connected body 34 disposed between the first plate 32 and the second plate 33. An outer diameter of the connected body 34 is shorter than both outer diameters of the first plate 32 and the second plate 33. The second plate 33 is connected with the fixing frame 10. The iron core 30 is a 工-shaped in terms of sectional surface in the vertical direction. The first plate 32, an outside wall of the connected body 34 and the second plate 33 are enclosed to form the winding groove 31 which is ring-shaped. In this way, the drive coil 40 may be fixed in the winding groove 31 more stably.

The above are only embodiments of the present disclosure. It shall be indicated that those of ordinary skill in the art can make improvements without departing from the creative concept of the present disclosure, and these belong to the protection scope of the present disclosure.

What is claimed is:

1. A vibration motor, comprising
a fixing frame, a suspending frame, an iron core, a drive coil, an elastic support, and
a magnetic steel assembly;
wherein the suspending frame is suspended and supported over the fixing frame by the elastic support;
the iron core is installed on the fixing frame;
the drive coil is wound around an outside wall of the iron core;
the magnetic steel assembly is installed on the suspending frame and disposed at intervals on a periphery of the iron core;
the magnetic steel assembly comprises a first magnetic steel, a second magnetic steel and a third magnetic steel that are superimposed in order; polarity directions of the first magnetic steel and third magnetic steel are parallel with a central axis of the drive coil, a polarity direction of the second magnetic steel is perpendicular to the central axis of the drive coil;
a side of the first magnetic steel that the side facing the second magnetic steel has the same polarity with a side of the third magnetic steel that the side facing the second magnetic steel; and
sides of the first and third magnetic steels that the sides being close to the second magnetic steel have the same polarity with a side of the second magnetic steel that the side being close to the drive coil;
wherein a side of the suspending frame that the side facing the fixing frame is provided with a first pillar;
a side of the fixing frame that the side facing the suspending frame is provided with a second pillar accordingly; and
the elastic support comprises a first fixing end connected with the first pillar, a second fixing end connected with the second pillar and a bending portion connected between the first fixing end and the second fixing end;
wherein the bending portion comprises an arc extending portion, a first inclined extending portion that is inclined and connected between the arc extending portion and the first fixing end, and a second inclined extending portion that is inclined and connected between the arc extending portion and the second fixing end;
the first inclined extending portion and the second inclined extending portion are inclined and extended to the arc extending portion from the first fixing end and the second fixing end with a distance between the first inclined extending portion and the second inclined extending portion gradually decreasing.

2. The vibration motor according to claim 1, wherein the vibration motor further comprises a magnetic conductive plate that is disposed between the magnetic steel assembly and the suspending frame.

3. The vibration motor according to claim 1, wherein the vibration motor comprises four elastic supports arranged at intervals out of the drive coil.

4. The vibration motor according to claim 1, wherein an outside wall of the iron core is provided with a winding groove, and the drive coil is wound in the winding groove.

5. The vibration motor according to claim 4, wherein the iron core comprises a first plate, a second plate that is disposed as parallel with the first plate and that is connected with the fixing frame, and a connected body disposed between the first plate and the second plate;
the first plate, an outside wall of the connected body and the second plate are enclosed to form the winding groove.

6. The vibration motor according to claim 1, wherein the vibration motor comprises an even number of the magnetic steel assembly, each two magnetic steel assemblies being one group that are disposed at two opposite sides of the drive coil.

7. The vibration motor according to claim 6, wherein the vibration motor further comprises a magnetic conductive plate that is disposed between the magnetic steel assembly and the suspending frame.

8. The vibration motor according to claim 6, wherein an outside wall of the iron core is provided with a winding groove, and the drive coil is wound in the winding groove.

9. The vibration motor according to claim 6, wherein the vibration motor comprises two magnetic steel assemblies that are symmetrically disposed at two opposite sides of the drive coil.

10. The vibration motor according to claim 9, wherein the vibration motor further comprises a magnetic conductive plate that is disposed between the magnetic steel assembly and the suspending frame.

11. The vibration motor according to claim 9, wherein an outside wall of the iron core is provided with a winding groove, and the drive coil is wound in the winding groove.

12. The vibration motor according to claim 6, wherein the vibration motor comprises four magnetic steel assemblies that are disposed at intervals around the drive coil.

13. The vibration motor according to claim 12, wherein the vibration motor further comprises a magnetic conductive plate that is disposed between the magnetic steel assembly and the suspending frame.

14. The vibration motor according to claim 12, wherein an outside wall of the iron core is provided with a winding groove, and the drive coil is wound in the winding groove.

* * * * *